US007280137B2

(12) United States Patent
Carau, Sr.

(10) Patent No.: US 7,280,137 B2
(45) **Date of Patent: *Oct. 9, 2007**

(54) REUSABLE CAMERA INCLUDING WRITE-ONCE NON-VOLATILE MEMORY

(75) Inventor: Frank Paul Carau, Sr., Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 722 days.

This patent is subject to a terminal disclaimer.

(21) Appl. No.: 10/319,225

(22) Filed: Dec. 12, 2002

(65) Prior Publication Data

US 2003/0133023 A1 Jul. 17, 2003

Related U.S. Application Data

(63) Continuation-in-part of application No. 09/851,102, filed on May 8, 2001, now abandoned.

(51) Int. Cl.
*H04N 5/76* (2006.01)

(52) U.S. Cl. .............................. 348/231.99; 348/222.1

(58) Field of Classification Search ........... 348/231.99, 348/231.1, 231.2, 231.7, 231.9, 222.1; 365/795, 365/57; 711/102
See application file for complete search history.

(56) References Cited

U.S. PATENT DOCUMENTS

| | | | | |
|---|---|---|---|---|
| 5,828,406 | A * | 10/1998 | Parulski et al. .......... | 348/220.1 |
| 6,424,553 | B2 * | 7/2002 | Berggren et al. ............ | 365/51 |
| 6,424,581 | B1 * | 7/2002 | Bosch et al. ................ | 365/195 |
| 6,646,912 | B2 * | 11/2003 | Hurst et al. ................. | 365/175 |
| 7,003,619 | B1 * | 2/2006 | Moore et al. ............... | 711/102 |

* cited by examiner

*Primary Examiner*—Vivek Srivastava
*Assistant Examiner*—Gevell Selby

(57) ABSTRACT

A reusable camera is provided. The camera comprises an image processing unit configured to capture images and a memory coupled to the image processing unit. The memory is configured to store a plurality of images to be captured by the image processing unit.

21 Claims, 3 Drawing Sheets

REUSABLE CAMERA INCLUDING WRITE-ONCE NON-VOLATILE MEMORY

BACKGROUND OF THE INVENTION

1. Field of the Invention

The present invention relates to cameras, and more particularly to a reusable camera that has some of the business advantages of a single-use camera.

2. Description of the Related Art

Disposable single-use cameras do not allow users to review, erase and re-take undesirable exposures before printing the exposures. Users must pay for every exposure to be printed. Disposable cameras are also a problem for the environment because each disposable camera is destroyed after its single use.

Digital cameras are expensive, and some types of digital cameras often become obsolete after a few years in view of rapid technological developments.

SUMMARY OF THE INVENTION

In accordance with some embodiments of the disclosed system, a reusable camera comprises an image processing unit configured to capture images and a write-volatile once non-volatile cross-point memory coupled to the image processing unit. The memory is configured to store a plurality of images to be captured by the image processing unit.

In accordance with other embodiments, a reusable camera comprises an image processing unit configured to capture images and a built-in, non-volatile memory coupled to the image processing unit. The memory can be configured to store images for capture by the image processing unit. The memory can be programmed in a manner that programming of at least one state is permanent and cannot be changed by reprogramming so that an image currently stored in a section of the memory cannot be replaced with a new image.

In accordance with another embodiment, a method of using a reusable camera comprises providing the reusable camera, the reusable camera comprising an image processing unit and a memory coupled to the image processing unit. The method further comprises programming the memory in a manner that programming of at least one state is permanent and cannot be changed by reprogramming so that an image currently stored in a section of the memory cannot be replaced with a new image. The method further comprises retrieving at least one image captured by the image processing unit and stored within the memory.

DETAILED DESCRIPTION

Digital cameras may be built as reusable cameras with flash memory. But flash memory is expensive, limited in capacity and may be illicitly modified ('hacked') by a user to bypass any restrictions on reuse that are installed by the camera's manufacturer.

What is desired is a reusable camera that has a special memory, a write-once, non-volatile memory.

In some embodiments, the reusable camera is the special memory that has an almost unlimited capacity to store captured images. For example, one embodiment of the special memory may store 10,000 or more images.

The illustrative reusable camera can have a relatively low cost of manufacturing and implementing the special memory, compared to other types of memory (e.g., compact flash memory) that are currently being used in digital cameras.

The special memory in the reusable camera can be utilized in a convenient way for camera manufacturers, camera dealers and photograph/print developers to control the use of reusable cameras and resulting print developments.

The special memory may be recycled and does not have to be discarded after a customer develops a single set of pictures.

In some examples, the reusable camera comprises an image processing unit configured to capture images and a Permanent Inexpensive Removable Memory (PIRM) coupled to the image processing unit. The memory is configured to store a plurality of images to be captured by the image processing unit.

The reusable camera can comprise an image processing unit configured to capture images and a built-in, non-volatile memory coupled to the image processing unit. The memory can be configured to store images to be captured by the image processing unit. The memory is unable to overwrite an image currently being stored in a section of the memory with a new image.

In an illustrative method of usage, a reusable camera can be provided with an image processing unit and a memory coupled to the image processing unit. The memory can be configured to store a plurality of images to be captured by the image processing unit. The memory is unable to overwrite an image currently being stored in a section of the memory with a new image.

In other method of usage, the reusable camera comprises an image processing unit and a memory coupled to the image processing unit. The memory is configured to store a plurality of images to be captured by the image processing unit. The method comprises retrieving at least one image captured by the image processing unit and stored within the memory. The memory is unable to overwrite an image currently being stored in a section of the memory with a new image.

Figure 1:
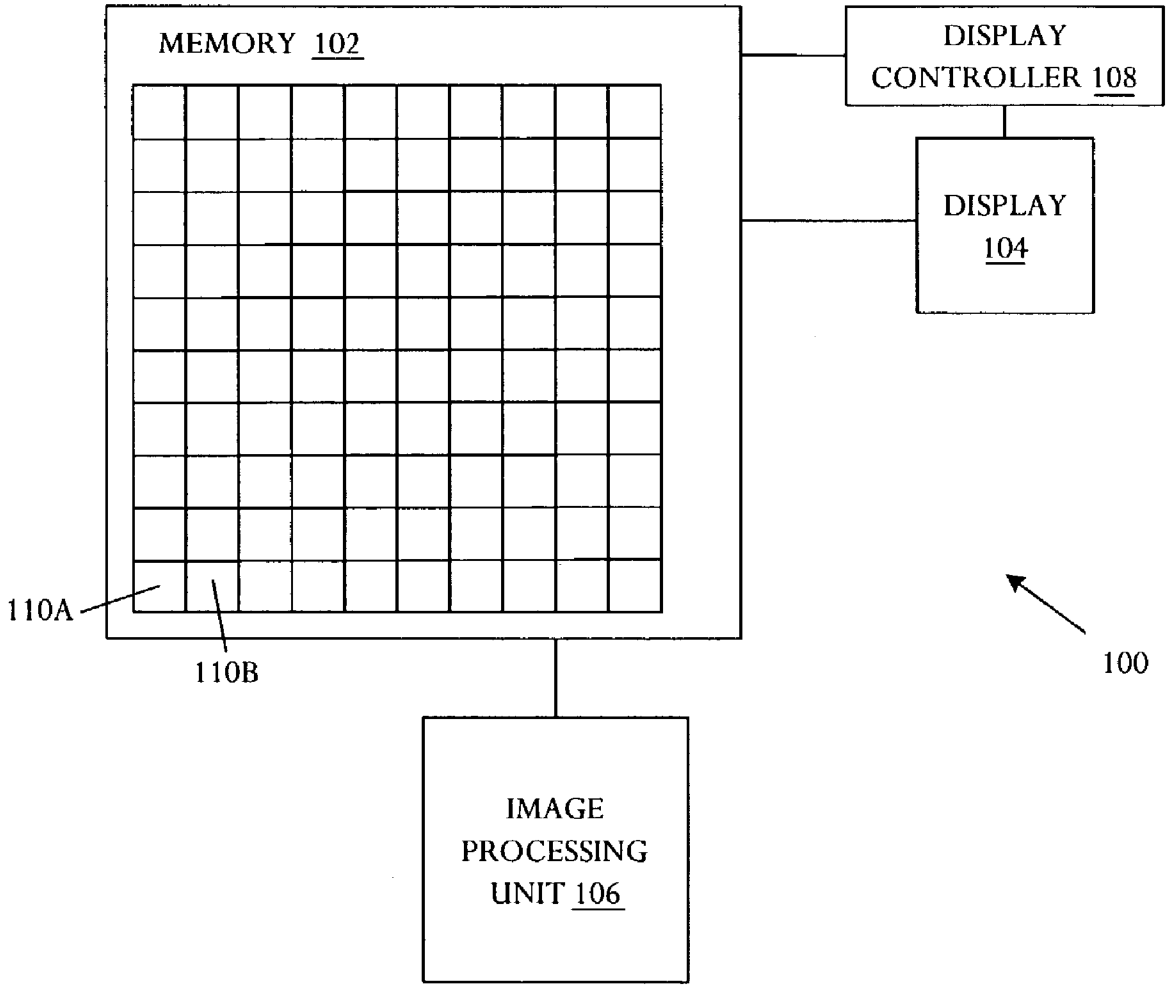
FIG. 1 illustrates one embodiment of a reusable camera in accordance with the present invention.

FIG. 1 illustrates one embodiment of a reusable camera 100 in accordance with the present invention. The camera 100 in FIG. 1 comprises a memory 102, a display 104, an image processing unit 106 and a display controller 108. Those of ordinary skill in the art will appreciate that the camera 100 in FIG. 1 may comprise other components in addition to or instead of the components described herein, such as a microprocessor, a power supply, a lens, filters and input and output data ports. In one embodiment, the camera 100 is a 'digital camera.'

In one embodiment, the memory 102 of FIG. 1 comprises a relatively large capacity, built-in, non-volatile, write-once memory. For example, one embodiment of the memory 102 comprises a Permanent Inexpensive Removable Memory (PIRM), which is being developed by Hewlett-Packard. Even though the term "PIRM" includes the adjective "Removable," one embodiment of the camera 100 has a built-in, non-removable PIRM. "PIRM" may also be referred to as a Portable Inexpensive Removable Memory.

One embodiment of a PIRM is described in a co-assigned U.S. patent application Ser. No. 09/875,356 and filed on Jun. 5, 2001, which is hereby incorporated by reference.

The write-once image memory device 102 comprises a cross-point memory array formed on a dielectric substrate material. The cross-point memory array comprises first and second sets of transverse electrodes separated by a storage layer including at least one semiconductor layer. The storage layer forms a non-volatile memory element at each crossing point of electrodes from the first and second transverse electrode sets. The individual memory elements can be switched between low and high impedance states that represent respective binary data states by applying a write signal in the form of a predetermined current density through the memory element. The individual memory elements include a diode junction formed in the storage layer at least while in the low impedance state.

In some memory embodiments the dielectric substrate is a formed from a polymeric material. In others the dielectric substrate is formed from a metal film such as stainless steel with an overlying coating of dielectric material.

Suitable dielectric substrates include, but are not limited to polyimide, polyethersulphone (PES), polyacrylate (PAR), polyetherimide (PEI), polyethylene napthalate (PEN), polyethylene terephthalate (PET), polyester terephthalate, polytetrafluoroethylene (PTFE), polycarbonate, and polyvinyl chloride (PVC).

The storage layer can be formed from material capable of processing at temperature lower than the processing temperature of the substrate material. In some examples, the at least one semiconductor layer of the storage layer is formed from an organic semiconductor material. In some embodiments the organic semiconductor material may be selected from among copper pthalocyanine (CuPc), PTBCI (3,4,9,10-perylenetetracarbonxilic-bis-benzimidazole), PTCDA (3,4,9,10 perylenetetracarboxilic danhydride), BTQBT [(1,2,5-thiadiazolo)-p-quinobis(1,3dithiole)], TPD (N,N'-diphenyl. N,N'-bis(3-methylphenyl)1-1'biphenyl-4,4'-diamine)1 α-NPD (4,4'-bis[N-(1-napthyl)-N-phenyl -biphenyl), and TPP (5,10,15,20tetraphenyl-21H,23H-porphine).

In other embodiments the at least one semiconductor layer of the storage layer can be formed from an amorphous inorganic semiconductor material such as amorphous silicon or germanium.

The write-once image memory device 102 may include address decoding circuitry coupled to the first and second sets of memory array electrodes. The address decoding circuitry can have first and second sets of input lines for addressing the first and second sets of electrodes, respectively. The first and second sets of input lines can be coupled through diode elements to selected ones of the first and second sets of memory array electrodes, respectively.

The write-once image memory device 102 may also include at least one data sense line having diode connections to each of the first and/or second set memory array electrodes.

The first and second sets of memory array electrodes can be formed in layers separated by the storage layer. The first and second sets of input lines can be formed in the same layers as the second and first sets of electrodes, respectively.

In some embodiments of the write-once image memory device 102, first and second input line sets are arranged to cross the first and second sets of memory array electrodes, respectively, separated by the storage layer. The storage layer at the crossing points forms selected diode connections between respective input lines and electrodes.

In some write-once image memory device 102 embodiments, power supply striping circuitry couples to the first and second sets of memory array electrodes. The power supply striping circuitry can comprise ends of the electrodes coupled through respective resistive elements and coupled in groups to selective power supply stripe lines.

A particular embodiment comprises a memory module with a plurality of module layers each having a write-once image memory device 102. In one configuration module layers combine by lamination to form a block with electrical contacts on at least one external surface of the block. The electrical contacts interconnect with the first and second input line sets, the at least one sense line, and the power supply stripe lines of individual module layers. Corresponding input lines from each of the plurality of module layers can be connected in parallel to address contacts for parallel addressing of the memory module arrays.

In some configurations the write-once image memory device 102 can comprise a plurality of memory circuits formed in a unitary package with individual memory circuits comprising a non-volatile cross-point memory array and an address decoding circuit fabricated on a common non-semiconductor substrate. Individual memory circuits can be formed from first and second layers of transverse conductor tracks separated by a storage layer including at least one semiconductor material layer. The memory array of the write-once image memory device 102 can comprise a matrix of memory elements with individual memory elements formed by overlying/underlying portions of conductor tracks from the first and second layers at a crossing point separated by the storage layer. The memory elements may be switched between low and high impedance states, representing respective binary data states, by applying a write signal at a predetermined current density through the memory element. Individual memory elements include a diode junction formed in the storage layer at least in the low impedance state. Accordingly, address decoding in the memory circuit comprises selected diode interconnections made through the storage layer between overlying and underlying portions of conductor tracks from the first and second layers at the track crossing points.

In general, one embodiment of a PIRM may be made from large sheets of a thin material such as plastic (e.g., mylar) with circuits formed in or on the material. The sheets may be cut, laminated and stacked in multiple layers. A relatively small PIRM unit may have a large memory capacity, such as 1 Gigabyte, and be able to store a large number of images, such as 1000 or 10,000 images. In one embodiment, the memory 102 comprises sections, such as first and second sections 110A, 110B shown in FIG. 1 (referred to herein individually as 'section 110' or collectively as 'sections 110'). In one embodiment, each section 110 may store image data once (write once) and cannot be effectively rewritten with new image data because of the properties of the memory 102.

Other embodiments of the camera 100 may use other types of memory. For example, the memory 102 may have a relatively small capacity memory. As another example, the memory 102 may be removable. As another example, the memory 102 may be erased and written with new data. In one embodiment, the camera 100 further comprises a separate memory (not shown) to store firmware used by the image processing unit 106.

The image processing unit 106 in FIG. 1 comprises hardware and firmware that captures, encodes and stores images in sections 110 of the memory 102. For example, the image processing unit 106 may comprise a microcontroller or microprocessor, a lens, a zoom unit, a flash and other components.

In one embodiment, a manufacturer of the camera 100 configures hardware and/or firmware within the image processing unit 106 (or associated with the image processing unit 106) to limit the number of images that a user may capture and store in the memory 102. For example, the camera manufacturer may configure the image processing unit 106 to only allow a user to capture and store 24 images before the user brings the camera 100 to a print developer to print some or all of the captured images. The manufacturer may set higher prices for cameras 100 configured with higher limits of captured images.

The display controller 108 of FIG. 1 may comprise any suitable controller or microprocessor for controlling the display 104. The display controller 106 may comprise hardware, such as an application specific circuit (ASIC), and firmware. In one embodiment, the display controller 106 is integrated with the image processing unit 106.

The display 104 of FIG. 1 may comprise any suitable display for displaying images stored in the memory 102 to a user. In one embodiment, the display 104 is a color liquid crystal display (LCD). The display 104 allows a user to invalidate undesirable images in the memory 102 such that the user does not have to pay for developing undesirable images into hard copy prints. In one embodiment, regardless of whether the camera 100 has a display 104, the user may invalidate the last N number of images, for example, by pressing a key on the camera 100.

In one embodiment, the camera manufacturer may configure the camera 100 to allow a user to invalidate a pre-determined number of captured images stored in the memory 102 and capture a pre-determined number of new images to be stored in other sections of the memory 102. For example, the camera manufacturer may configure the camera 100 to allow a user to invalidate up to 10 captured images stored in the memory 102 and capture 10 new images to be stored in other sections of the memory 102. The camera 100 may be configured to allow a user to invalidate any number of captured images stored in the memory 102.

Thus, the camera manufacturer may pre-configure at least three limits for each camera 100: (1) the total number of images that a user may capture and store in the memory 102, e.g., 100, (2) the number of captured images that a user may print, e.g., 30, (3) the number of images a user may invalidate, e.g., a user may invalidate some or all of the captured images stored in the memory 102. The camera manufacturer may sell the camera 100 at different prices depending on these three limits.

In one embodiment, the camera manufacturer may set anti-tampering hardware or software in the camera 100 to prevent users from changing any of the three pre-configured limits described above without the authorization of the camera manufacturer or its licensee. The camera manufacturer may sell software and/or hardware to licensees or end-users to change one or more of the pre-configured limits.

In one embodiment, in addition to or instead of the three pre-configured limits described above, the camera 100 may be configured to limit the total number of images that a user may capture and store in the memory 102 during a predetermined time period, such as a month.

In one embodiment, only special software controlled by the camera manufacturer and its licensees, such as photograph/print developers, may decode and retrieve images encoded and stored in the memory 102.

In one embodiment, when an image is read out of a section 110 of the memory 102, the image processing unit 106 invalidates (blanks out) the particular section 110 where the image was retrieved. When a user captures new images with the camera 100, the image processing unit 106 is configured to store the images in unused sections 110 of the memory 102.

Figure 2:
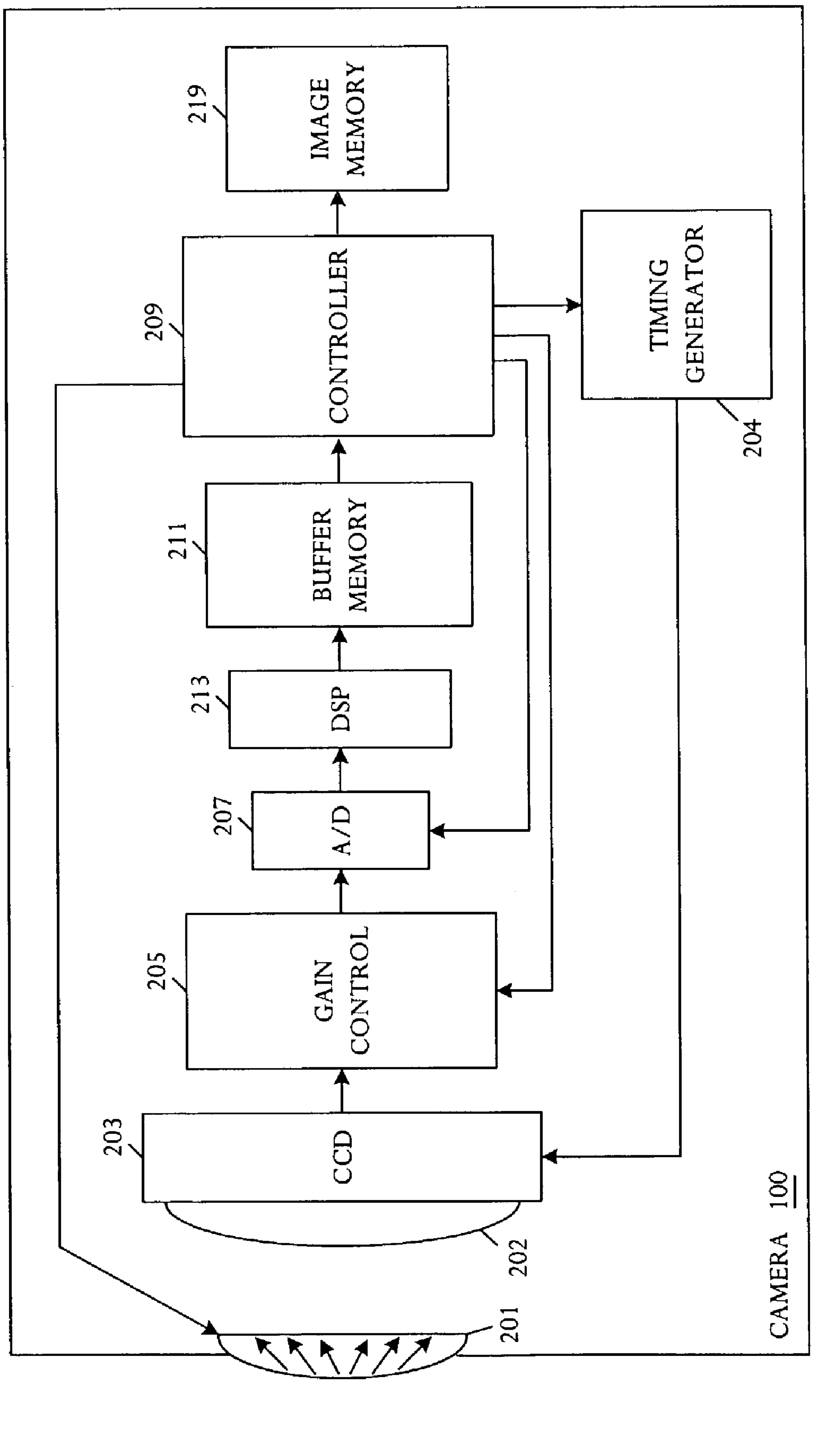
FIG. 2 is a block diagram showing an alternative embodiment of a reusable camera that includes a write-once image memory.

Referring to FIG. 2, a block diagram shows an alternative embodiment of a reusable camera 200 that includes a write-once image memory 223. The illustrative reusable camera 200 includes an optical lens 201, an array of charge-coupled device (CCD) detectors 203, a gain control circuit 205, an analog to digital converter (ADC) 207, and a controller 209. The illustrative reusable camera 200 also includes a buffer memory 211, an image processing device 213, and the write-once image memory device 223. The array of CCD detectors 203 can further include an array of color filters 202, each associated with a detector of the CCD detectors 203. The controller 209 is any suitable processor or controller device such as a microprocessor, a central processing unit (CPU), a digital signal processor (DSP), a programmable logic array, or the like. The illustrative controller 209 further can include executable programs, processes, and methods that control writing of images to the write-once image memory device 219. The image processing device 213 can be a digital signal processor (DSP) or other typically high-speed processor suitable for handling quantities of multiple-dimensional data.

Light enters the reusable camera 200 through the optical lens 201 and is focused on the array of CCD detectors 203. The color filters 202 associated with the detectors in the CCD detector array 203 cause detectors to be sensitive to a particular color. The filters and detectors are arranged in a suitable configuration with some detectors sensitive to red light, some to green, and some to blue.

The detectors accumulate a charge representative of the amount of light in one CCD pixel. A timing generator 204 is coupled to the CCD detectors 203 and controls reading of the CCD detectors 203. Signals from the timing generator 204 control application of the charge accumulated by the individual detectors to the gain control circuit 205 in a serial manner. The controller 209 is coupled to the timing generator 204 and controls operation of the timing generator 204.

The timing generator 204 is capable of flushing the CCD detectors 203 to substantially discharge any charge previously accumulated within the detectors. Once the CCD detectors 203 are flushed, light that passes through the optical lens 201 and the color filters 202 causes charge to accumulate on the individual detectors within the CCD detectors 203 in an amount that is proportional to the quantity of light that strikes the detectors. The accumulated charge on each detector within the CCD array 203 results in a voltage that is coupled to the gain control circuit 205.

The controller 209 is coupled to the gain control circuit 205 that manages automatic gain control and passes gain-controlled information to the A/D converter 207. The A/D converter 207 converts the gain-controlled information to digital data directly proportional to the amount of light detected by each detector.

The A/D converter 207 is coupled to the image processing device 213 that processes the color information and may temporarily store the information in the buffer memory 211. The image processing device 213 can perform operations such as demosaic function, automatic white balance, image sharpening, and the like.

The controller 209 stores the processed images to the write-once image memory device 219 for subsequent access.

Figure 3:
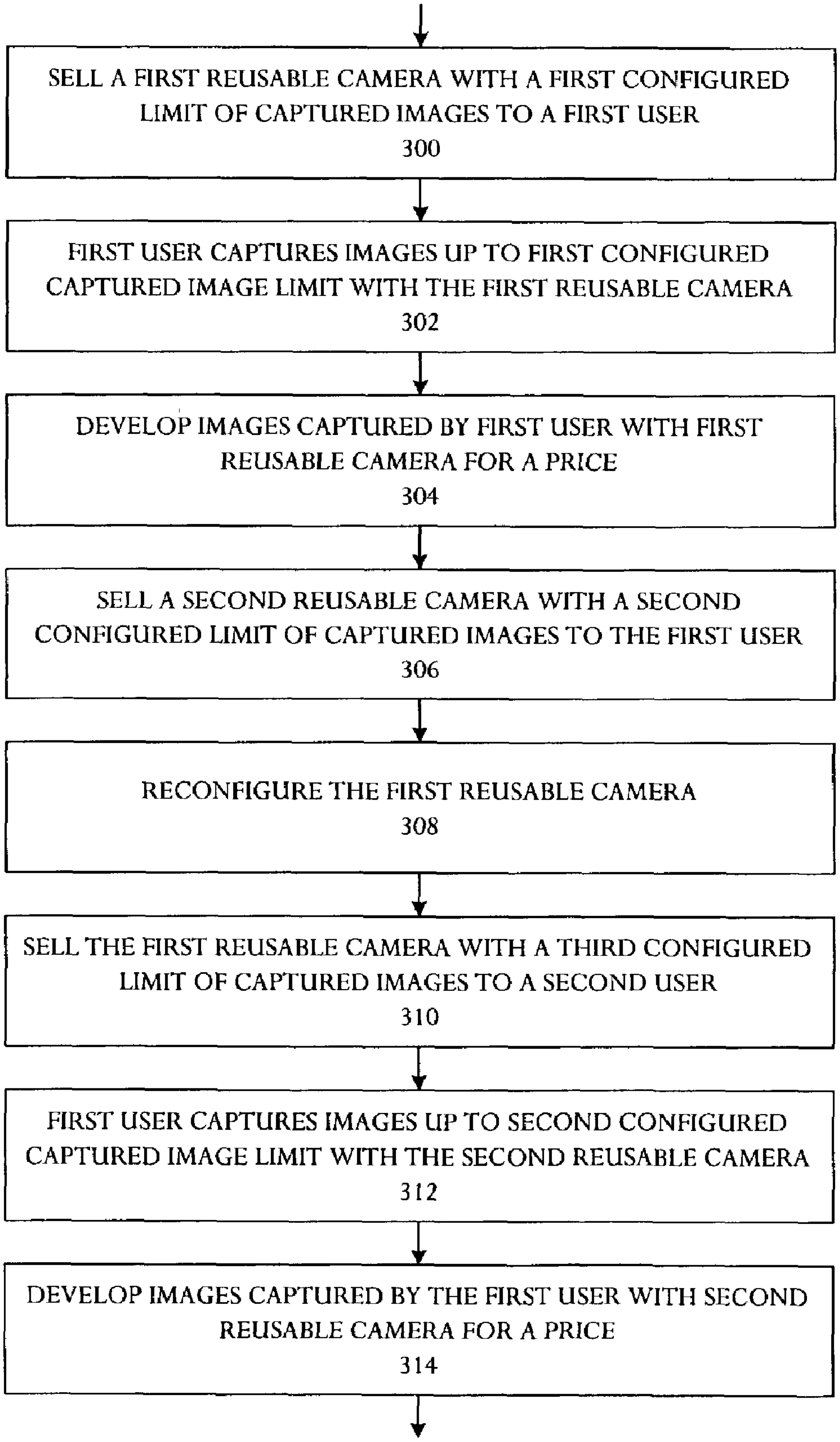
FIG. 3 illustrates one embodiment of a method of using a plurality of cameras, such as the camera shown in FIG. 1.

FIG. 3 illustrates one embodiment of a method of using a plurality of cameras, such as the camera 100 shown in FIG. 1. In a block 300 of FIG. 3, a camera manufacturer or authorized dealer sells, leases or otherwise provides a first reusable camera, such as the camera 100 in FIG. 1, with a first configured limit of captured images, e.g., 30, to a first user. In a block 302 of FIG. 3, the first user captures and stores images up to the first configured limit with the first reusable camera.

In a block 304 of FIG. 3, the first user brings the first reusable camera to a print developer to develop the images captured by the first user for a price. The print developer may use authorized software from the camera manufacturer or authorized dealer to retrieve the images stored in the memory 102 (FIG. 1) of the first reusable camera.

In a block 306 of FIG. 3, the print developer may sell, lease or otherwise provide a second reusable camera with a second configured limit of captured images to the first user. The second configured limit may be higher, lower or equal to the first configured limit.

In a block 308 of FIG. 3, the print developer may use software, hardware or both software and hardware to reconfigure the first reusable camera. Alternatively, the printer developer may send the first reusable camera to the camera manufacturer or dealer to reconfigure the first reusable camera. For example, the print developer, camera manufacturer or dealer may invalidate sections of the memory that stored images, which have been retrieved by the print developer. The print developer, camera manufacturer or dealer configure the image processing module 106 in the camera to store images in unused sections of the memory 102. The print developer, camera manufacturer or dealer may perform other functions to prepare the first reusable camera to be used by the first user or another user.

In a block 310 of FIG. 3, the printer developer, camera manufacturer or dealer may sell, lease or otherwise provide the first reusable camera with a third configured limit of captured images to the first user or a second user. The third configured limit may be higher, lower or equal to the first and second configured limits.

In a block 312 of FIG. 3, the first user captures and stores images up to the second configured limit with the second reusable camera. In a block 314 of FIG. 3, the print developer develops images captured by user with the second reusable camera for a price.

In another method of using the camera 100, the camera manufacturer provides unlimited use of the memory 102 to a user of the camera 100. But the camera manufacturer or a licensee charges the user for a number of prints and a number of deleted images, e.g., $2.00 for each print and $0.25 for each deleted (non-printed) image. The camera 100 allows the customer to take a very large (almost unlimited) number of pictures with a single camera without buying film, which may be particularly useful while the user is on vacation. Also, the user will only have to pay a small charge for bad images.

The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. A reusable camera comprising:

an image processing unit configured to capture images; and a write-once non-volatile cross-point memory coupled to the image processing unit and comprising a plurality of individual memory elements including a diode junction formed in a storage layer at least in a low impedance state, the memory being configured to store a plurality of images to be captured by the image processing unit.

2. The camera of claim 1, wherein the camera comprises a digital camera.

3. The camera of claim 1, wherein the write-once non-volatile cross-point memory is built into the camera.

4. The camera of claim 1, wherein the write-once non-volatile cross-point memory is removable from the camera.

5. The camera of claim 1, wherein the write-once non-volatile cross-point memory comprises a matrix of memory elements that switch between low and high impedance states representing respective binary data states by applying a write signal at a predetermined current density through the memory element.

6. The camera of claim 1, wherein the write-once non-volatile cross-point memory is configured to store over a hundred images.

7. The camera of claim 1, wherein the write-once non-volatile cross-point memory is programmed in a manner that programming of at least one state is permanent and cannot be changed by reprogramming.

8. The camera of claim 1, wherein the image processing unit encodes image data before storing the image data in the write-once non-volatile cross-point memory.

9. The camera of claim 1, wherein the image processing unit is configured to store a pre-determined number of images in the write-once non-volatile cross-point memory.

10. The camera of claim 9, further comprising software executable on the image processing unit that is capable of setting and enforcing one or more of limits on the total number of images that a user may capture and store in the memory, the number of captured images That a user may print, and the total number of images a user may invalidate.

11. A reusable camera comprising:

an image processing unit configured to capture images; and a write-once non-volatile cross-point memory coupled to the image processing unit and comprising a plurality of individual memory elements including a diode junction formed in a storage layer at least in a low impedance state, the memory being configured to store a plurality of images to be captured by the image processing unit, wherein the image processing unit is configured to store a pre-determined number of images in the write-once non-volatile cross-point memory and configurable by an external system to store more than the pre-determined number of images in the write-once non-volatile cross-point memory.

12. The camera of claim 1, Thither comprising a display coupled to the write-once non-volatile cross-point memory, the display being configured to display images stored in the write-once non-volatile cross-point memory.

13. A reusable camera comprising:

an image processing unit configured to capture images; and a write-once non-volatile cross-point memory coupled to the image processing unit and comprising a plurality of individual memory elements including a diode junction formed in a storage layer at least in a low impedance state, the memory being configured to store a plurality of images to be captured by the image processing unit wherein the image processing unit is configured to allow a user to invalidate a pro-determined number of images stored in the write-once non-volatile cross-point memory.

14. The camera of claim 1, wherein the image processing unit is configured to allow a user to select a pre-determined number of images stored in the write-once non-volatile cross-point memory to be retrieved from the write-once non-volatile cross-point memory.

15. A reusable camera comprising:

an image processing unit configured to capture images; and a built-in, non-volatile memory coupled to the image processing unit and comprising a plurality of individual memory elements including a diode junction formed in a storage layer at least in a low impedance state, the memory being configured to store images to be captured by the image processing Unit, the memory being programmed in a manner that programming of at least one state is permanent and cannot be changed by reprogramming so that an image currently stored in a section of the memory cannot be replaced with a new image.

16. The reusable camera of claim 15, wherein the image processing unit is configured to store a pre-determined number of images in the memory.

17. A method of using a reusable camera, the method comprising:

providing the reusable camera, the reusable camera comprising an image processing unit and a write-once non-volatile cross-point memory coupled to the image processing unit;

programming a plurality of diode junctions formed in a storage layer at least in a low impedance state for individual memory elements whereby programming of at least one state is permanent and cannot be changed by reprogramming so that an image currently stored in a section of the memory cannot be replaced with a new image; and retrieving at least one image captured by the image processing unit and stored within the memory.

18. The method of claim 17 further comprising: setting and enforcing one or more of limits on the total number of images that a user may capture and store in the memory, the number of captured images that a user may print, and the total number of images a user may invalidate.

19. The method of claim 17 further comprising:

invalidating a section of the memory that stores an image captured by the image processing unit.

20. A reusable camera comprising:

an image processing unit configured to capture images; and a write-once non-volatile cross-point memory coupled to the image processing unit, the memory being configured to store a plurality of images to be captured by the image processing unit, wherein the image processing unit is configured to store a pre-determined number of images in the write-once non-volatile cross-point memory and configurable by an external system to store more than the pre-determined number of images in the write-once non-volatile cross-point memory.

21. A reusable camera comprising: an image processing unit configured to capture images; and a write-once non-volatile cross-point memory coupled to the image processing unit, the memory being configured to store a plurality of images to be captured by the image processing unit, wherein the image processing unit is configured to allow a user to invalidate a pre-determined number of images stored in the write-once non-volatile cross-point memory.

* * * * *

UNITED STATES PATENT AND TRADEMARK OFFICE

CERTIFICATE OF CORRECTION

PATENT NO. : 7,280,137 B2
APPLICATION NO. : 10/319225
DATED : October 9, 2007
INVENTOR(S) : Frank Paul Carau, Sr.

It is certified that error appears in the above-identified patent and that said Letters Patent is hereby corrected as shown below:

In column 1, line 25, after "write-" delete "volatile".

In column 3, line 39, after "N-phenyl" delete "-" and insert -- -amino] --, therefor.

In column 8, line 36, in Claim 10, delete "That" and insert -- that --, therefor.

In column 8, line 54, in Claim 12, delete "Thither" and insert -- further --, therefor.

In column 9, line 1, in Claim 13, delete "pro-determined" and insert -- pre-determined --, therefor.

In column 9, line 17, in Claim 15, delete "Unit" and insert -- unit --, therefor.

Signed and Sealed this

Seventeenth Day of June, 2008

JON W. DUDAS
*Director of the United States Patent and Trademark Office*